United States Patent Office 2,782,866
Patented Feb. 26, 1957

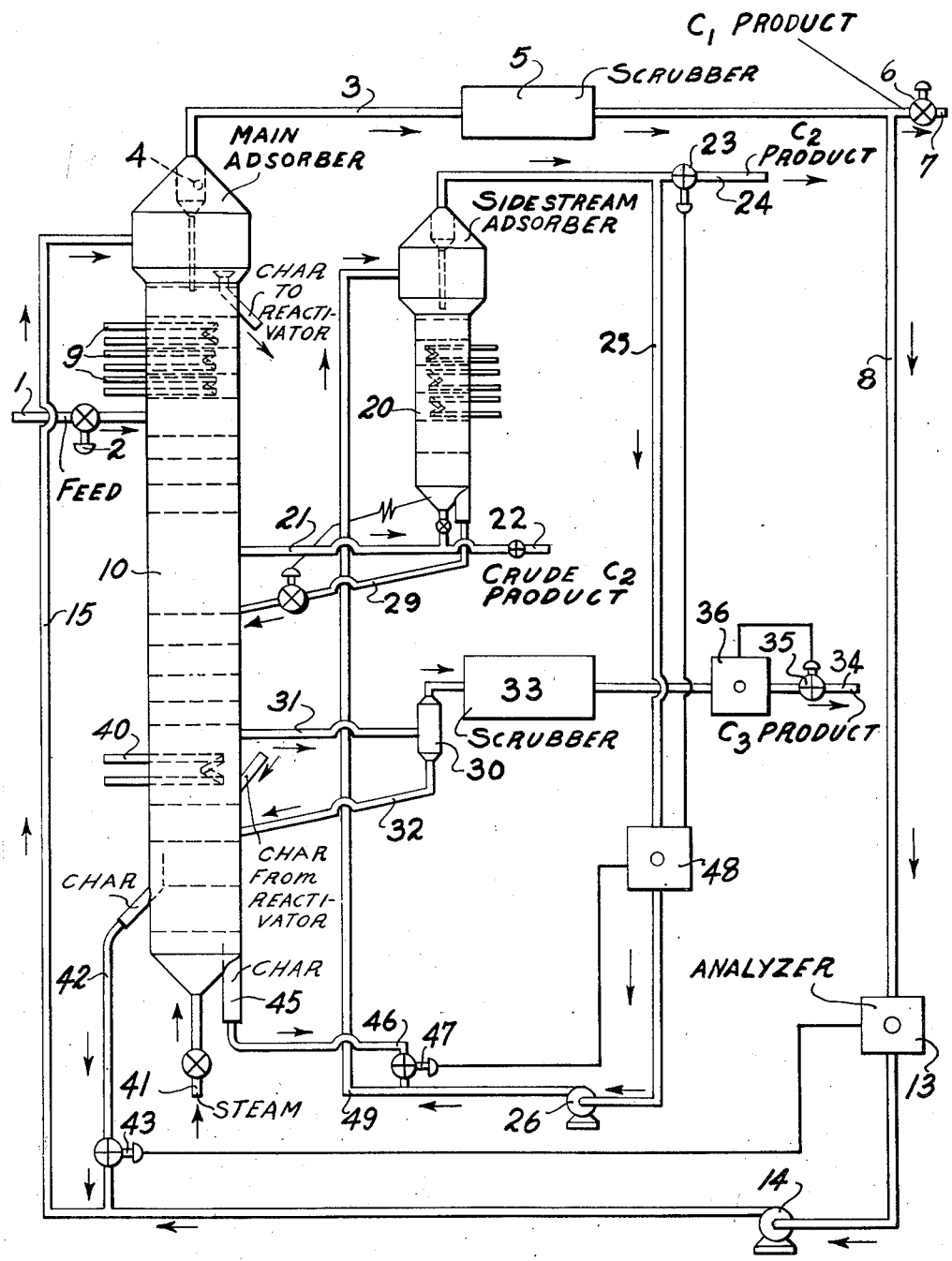

2,782,866

CONTROLLED ADSORPTION PROCESS AND APPARATUS

Lewis D. Etherington, Cranford, Harvey E. W. Burnside, Locust, and James W. Brown, Mountainside, N. J., assignors to Esso Research and Engineering Company, a corporation of Delaware Application June 9, 1954, Serial No. 435,562

9 Claims. (Cl. 183—4.1)

This invention relates to a controlled adsorptive separation process and apparatus. In its preferred embodiment it relates to a method for controlling the purity of products obtained in a continuous adsorption process employing a fluidized finely divided adsorbent.

It is well known that gaseous or liquid mixtures can be separated into their components by contacting with various solid adsorbents such as activated carbon. In such adsorption processes the more readily adsorbable component is retained on the solid in preference to the less readily adsorbable component which can be recovered as such. The adsorbed component can then be recovered from the more or less saturated solid adsorbent by desorption which usually involves the use of heat or stripping gases such as steam or a combination of both. Sometimes desorption is also accomplished by washing the saturated adsorbent with a liquid such as hydrocarbon oils, alcohols, ketones, other oxygenated hydrocarbons, or water.

Adsorption has been found particularly advantageous for separating mixtures of gaseous hydrocarbons, for instance, mixtures containing principally hydrogen, nitrogen, carbon oxides and $C_1$ to $C_3$ hydrocarbons. When such hydrocarbon mixtures are intimately contacted with activated carbon or charcoal, the hydrocarbons can be fractionated roughly according to molecular weight. When other adsorbents such as alumina and/or silica gels are used, fractionation can be obtained by type since such solids display an affinity for the olefinic or more unsaturated hydrocarbons in preference to the paraffinic or less unsaturated ones.

Two principal designs have been developed to date for practicing countercurrent gas adsorptive separations on a continuous commercial scale. In the so-called hypersorption design the adsorber is operated as a soaker-type vessel in which relatively coarse adsorbent such as charcoal of about 10 to 30 mesh particle size is packed in a tower and allowed to gravitate as a closely packed bed at a fixed slow rate from the top to the bottom of the tower. In such a system the adsorptive separation is essentially adiabatic, the char inventory is quite large, and the separation inherently tends to occur in a large number of stages if vapor and solids channeling is not excessive. Due to these features, distinct naturally occurring temperature plateaus are encountered at bed levels where rapid separations between fractions occur and the positions of such plateaus in the tower provide a convenient basis for process control. That is, as soon as one of these temperature plateaus begins to move away from its usual position in the tower, a departure from desired operating condition is indicated and proper steps can then be taken to restore the desired conditions.

The other principal design employs fluid adsorption. Here countercurrent flow between adsorbent and gasiform feed is effected by providing an adsorption vessel with perforated plates, bubble-cap plates, baffles or equivalent devices such as stationary random packing. The plates may be provided with weirs and downcomers to facilitate flow of the charcoal from plate to plate down the tower. At the same time the plate construction is such that gases are enabled to flow up through the plate openings without allowing downward passage of charcoal therethrough. Thus on each plate the charcoal forms a dense bed which is fluidized by the upflowing gases and which has a depth determined largely by the weir height. As more char flows onto any plate, a corresponding amount flows over its weir and through the downcomer to the plate below. For this type of process the adsorbent is finely divided to a particle size of about 10 to 300 microns so that it can be fluidized by the process gas when the latter flows upward at a linear velocity of about 0.2 to 3 feet per second.

The fluid process has important advantages over a soaker-type operation since it (1) requires only a comparatively small inventory of usually expensive adsorbent; (2) exhibits about 10-fold higher heat transfer coefficients; (3) permits interstage cooling and heating which save on adsorbent circulation, heat transfer surface, and utilities; (4) permits higher vapor velocities and correspondingly lower tower volume; (5) is less subject to channeling of tower solids and vapor; and (6) provides for easier control of solids circulation.

It will be recognized, of course, that any adsorption process inherently has an additional degree of freedom as compared with conventional vapor-liquid separation. For example, in contrast to liquid distillation, the temperature in an adsorption tower at a given total pressure and fixed gas composition may be varied at will by extraneous cooling or heating. Hence, tower temperatures are not necessarily indicative of the degree of adsorptive separation. Furthermore, in view of the foregoing advantages, it is especially true of fluid adsorption that any sharp temperature difference between adjacent stages or plates is usually induced by extraneous heating or cooling and such temperature differences may vary depending on control of heating and cooling. Consequently, unlike in the soaker-type operation, sharp temperature breaks or plateaus may not be relied upon here for control of product purities, products withdrawal, and adsorbent circulation rates.

It is therefore an object of this invention to provide an effective and reliable process and apparatus for control of continuous adsorption operations. A more specific object is to provide a reliable control for char circulation rates and product withdrawal rates in a fluid adsorption process so that the separation is maintained at the desired degree of efficiency and product purity. Still another object is to control fluid adsorption in connection with a fluid reactivation step. These and other objects as well as the general nature and specific embodiments of the invention will become more clearly apparent from the following description and attached drawing.

The drawing illustrates a schematic flow plan of a plant particularly adapted for the adsorptive separation of $C_1$—$C_2$—$C_3$ hydrocarbon mixtures into three narrow cuts according to their molecular weights. For instance, the separation summarized in Table I may be effected with the aid of the present invention. Unless otherwise indicated, it will be understood that all percentages and proportions of gases are expressed on a mol or volume basis throughout this specification.

TABLE I

*1. Material Balance (Basis: lb.–Mols/Stream hour) (Neglecting small reactivator losses and small $C_4+$ quantities)*

| Stream No.[1] | Feed Gas | | $C_2$ Product[2] | | $C_3$ Product | | Tail Gas | |
|---|---|---|---|---|---|---|---|---|
| | 1 | | 24 | | 34 | | 7 | |
| Composition | Mols | Percent | Mols | Percent | Mols | Percent | Mols | Percent |
| $H_2$, CO, $N_2$ | 892 | 20.7 | | | | | 892 | 41.6 |
| $CH_4$ | 1205 | 28.0 | 13 | 0.8 | | | 1192 | 55.5 |
| $C_2H_4$ | 657 | 15.2 | 631 | 40.8 | 1 | 0.2 | 25 | 1.1 |
| $C_2H_6$ | 907 | 21.1 | 890 | 57.7 | 2 | 0.3 | 15 | 0.7 |
| $C_3H_6$ | 344 | 8.0 | 6 | 0.4 | 326 | 52.8 | 12 | 0.65 |
| $C_3H_8$ | 303 | 7.0 | 5 | 0.3 | 288 | 46.7 | 10 | 0.45 |

[1] Stream numbers are keyed to attached drawing.
[2] Based on sidestream adsorber operation. The crude $C_2$ sidestream from the main adsorber contains about 10-times more $C_3$'s.

2. Adsorber Char Rate: 900,000 lbs./stream hour.
3. Desorption Steam Rate: 45,000 lbs./stream hour.
4. Reactivator Char Rate: 10,000 lbs./stream hour.
5. Reactivator Steam Rate: 10,000 lbs./stream hour.
6. Sidestream Adsorber Char Rate: 100,000 lbs./stream hour.
7. Adsorptive separation pressure approximately 6 atmospheres.

Referring to the drawing, a gaseous feed mixture containing principally a $C_1$ fraction (methane, hydrogen, nitrogen and carbon monoxide), a $C_2$ fraction (mainly ethane and ethylene), and a $C_3$ fraction (propane, propylene and small amounts of heavier hydrocarbons) is fed at substantially constant pressure and volumetric rate through line 1 and flow control valve 2 into adsorption tower 10, usually in the vicinity of the middle portion thereof. This feed gas may be at a temperature of usually about 200° F. or lower, depending on the available feed gas temperature and its sensible heat relative to adsorption heat and sensible heat of the adsorbent. Finely divided activated coconut char descending through the tower countercurrently contacts the gaeous feed and selectively adsorbs the $C_2$ and $C_3$ fractions, that is, the key components for the present example, and relatively small equilibrium quantities of the methane fraction. The bulk of the latter passes up through the tower and leaves through outlet line 3, preferably after passage through a gas-solid separator such as cyclone 4 where entrained solid fines may be recovered and returned to the system. If desired, additional fines recovery and gas dehydration equipment may be provided such as water scrubber 5.

Net overhead methane product is withdrawn through pressure control valve 6 and withdrawal line 7 while a portion of the light gases is usually recycled through line 8 to serve as lift gas as described later. The amount of net overhead methane product withdrawn is a dependent variable which is usually determined by the top tower pressure. This top tower pressure may be between about 0 and 600 p. s. i. g. depending on available feed pressure, type of feed and economic considerations such as relation of compression costs versus adsorption costs. For instance, with feeds containing substantial amounts of acetylene it is advisable to operate at pressures below about 50 p. s. i. g. since acetylene becomes explosive at higher pressures. On the other hand, natural gas is frequently available at pressures in excess of 500 p. s. i. g. and in such cases it may be most economical to operate near the maximum pressure available. In the particular example described a pressure of about 200 p. s. i. g. is suitable. Cooling coils 9 are provided in the adsorption section above the feed inlet line 1 so as to maintain the minimum adsorbent temperature at about 100 to 250° F., if water is used as the coolant. It may be desirable to cool in several stages so as to minimize total cooling surface and the surface per stage. For instance, three consecutive cooling stages may be operated at 120°, 200° and 300° F., respectively, keeping the lowest temperature near the feed inlet and a temperature of about 400° F. in the top one to three stages of the tower. These hot stages principally serve the purpose of dehydrating the char. Where low operating pressures are particularly desired so as to facilitate desorption, and for other reasons, it may be desirable to operate at still lower adsorption temperatures, using propane, freon or the like as refrigerants.

The charcoal containing the adsorbed heavier components passes down the tower past the feed pipe into a portion of the rectification zone between lines 1 and 21 wherein the charcoal is refluxed by predominantly $C_2$ and heavier hydrocarbon gases passing up from the desorption zone as further explained below. These gases tend to strip the methane fraction from the charcoal in the upper portion of the rectification zone and are themselves readsorbed. The $C_2$ hydrocarbon gas fraction containing essentially no methane but unavoidable small equilibrium amounts of $C_3$ and heavier hydrocarbons is removed from tower 10 through line 21 and, where a high purity product is desired, passed to sidestream adsorber 20 whose operation will be described later. In the main adsorber 10 the charcoal continues its descent through the remaining portion of the rectification zone between lines 21 and 31 wherein refluxed $C_3$ and heavier hydrocarbons desorb the intermediate $C_2$ components while $C_3$ and heavier hydrocarbons are readsorbed.

The char then reaches the desorption zone or bottom tower portion which contains heater 40. In this region the char is heated to about 450–550° F. to release the adsorbed components, mainly the $C_3$ and higher hydrocarbons. Assisting the heat in this regard is the action of steam or other stripping gas introduced into the bottom of the vessel through line 41. The net product portion of the released $C_3$ fraction is removed from tower 10 through aforementioned line 31 and the remaining desorbed portion passes up in the tower to serve as reflux as previously mentioned. If desired, the total desorbed wet $C_3$ tower vapor may be withdrawn in line 31, dried in scrubber 33, the product portion withdrawn via line 34, and the remaining dried portion returned as dried reflux to tower 10 at a point above line 31.

The main portion of the stripped char leaves tower 10 at the steaming section of the desorption zone through standpipe 42. This is provided with slide valve 43 which controls the required char rate to tower 10. Valve 43 is so constructed and connected that it is responsive to the analytical composition of the tower overhead gas. For example, if $C_2$ is the least adsorbable of the key components to be adsorbed and its concentration increases beyond the specified amount in the methane overhead product fraction, e. g. above about 0.1 to 1%, then valve 43 opens more widely so as to increase the char circulation rate through tower 10 and so to reduce the $C_2$ content of the overhead to the desired value. For instance, valve 43 may be actuated in an otherwise well-known manner by an electrical or pneumatic impulse given off by a mass spectograph, infra-red analyzer or other suitable analytical instrument 13 which continuously analyzes the composition of the methane overhead stream 8. Of course, instead of having valve 43 operated automatically in the manner described, it can be adjusted manually by an operator in response to readings taken on analyzer 13. Furthermore it will be readily understood that, instead of the preferred control mechanism just described, the advantages of the invention can be obtained similarly by regulating the gas feed rate, rather than the char rate, in response to the signal from analyzer 13. Specifically, when the $C_2$ content of the $C_1$ product fraction increases, it is feasible to throttle the fresh gas feed rate rather than increase the char circulation rate, inasmuch as the determining factor is not so much the absolute value of the char circulation rate, but the ratio of this char rate to the gas feed rate in the adsorption zone.

The tail gas in stream 8 may serve as a lift gas for the char in accordance with general principles which are now conventional in handling fluidizable solids. For this purpose the gas may be compressed by blower 14 and injected into the hot recycle char discharged from valve 43, the amount of gas so injected being sufficient so as to maintain pressure balance in the system. Generally this amount of gas will be proportional to the char rate which in turn is controlled by valve 43 and ultimately by analyzer 13. The resulting solid-in-gas suspension is then returned to the top of tower 10 through line 15. One of the preferred methods of controlling the lift gas rate is through the pressure drop across the vertical section of the lift pipe. This pressure drop is a measure of the ratio of lift gas volume to suspended solids, a critical gas lift variable. In addition it is advisable to use a "limit control" on the char rate, e. g., use a valve opening of such size that when the valve is wide open the char rate is fixed at a specified maximum such as 15 to 30% above normal operating rate. Similarly the lift gas rate may be controlled by the size of the blower in such a fashion that the gas rate is constant at a rate corresponding to the maximum char rate. With a constant lift gas rate the lift line pressure drop can then be used as a check on the slide valve pressure drop in measuring the char rate. The provision of such limit controls assures against excessive cycling and upsetting of the entire system such as might tend to occur if other reasons make it necessary to withdraw less $C_2$ product than would be required to satisfy the material balance and consequently the $C_2$ content of the tail gas is forced above the specified limit.

In the event that a $C_2$ product of only moderate purity is needed, about 90–95% for example, this can be withdrawn directly through lines 21—22. Or, if only one relatively light fraction such as stream 7 and one relatively heavy fraction such as stream 31 are to be separated, no sidestream need be withdrawn at all. However, in many instances such as in ethanol production it is frequently essential to recover an ethylene-containing stream of very high purity, e. g., one containing less than 1% propylene. In such an event, the aforementioned sidestream adsorber 20 is employed and the crude $C_2$ draw-off 22 is shut off.

When the sidestream adsorber 20 is used a comparatively small portion of the highly stripped char in the bottom of tower 10 is withdrawn through well 45, standpipe 46 and slide valve 47 and circulated to adsorber 20 through line 49. The amount of this char may equal between about 2 and 35 weight percent of the char passing to the main adsorber through line 15. Valve 47 is similarly constructed as aforementioned valve 43 and is actuated by impulses from an analyzer such as mass spectrograph 48 which measures the purity of the $C_2$ product. Thus, if the $C_3$ content of the $C_2$ product increases beyond the specified maximum, valve 47 will discharge an increased amount of char into line 49 through which the char is raised with the aid of a compressed lift gas to the top of adsorber 20. The char then descends through adsorber 20, forming a plurality of fluidized beds similar to those in main adsorber 10.

Aforementioned stream 21 which is withdrawn from the main adsorber at a plate below the feed plate, that is, at the bottom of the $C_2$ enriching section of the rectification zone, consists essentially only of $C_2$, $C_3$ and heavier components. This stream is passed upwardly into and through adsorber 20, counter-currently to the descending char. Here the char adsorbs the $C_3$ and heavier hydrocarbons allowing a purified $C_2$ stream to be removed from the vessel through valve 23 and line 24. Valve 23 may also be keyed to analyzer 48 and made responsive to the $C_1$ content of the purified $C_2$ product stream. That is, the net amount of $C_2$ product is reduced if its $C_1$ content exceeds the allowable limit, e. g. 0.01–1%, whereas the $C_2$ withdrawal rate may be increased if its $C_1$ content falls below the allowable limit. The withdrawal rate of the $C_2$ product is generally such that it corresponds to a $C_2$ recovery of about 95 to 99% or better. A portion of the $C_2$ product may also be recycled through line 25 and blower 26 to serve as lift gas in aforementioned line 49.

The descending char is returned through line 29 from the secondary adsorber to the main adsorber at a point beneath the withdrawal of sidestream 21. At this point the chars in the main tower and the return line 29 have about the same adsorbate composition and descend through main tower 10 to undergo desorption as previously described. The rate of char return from tower 20 to tower 10 may be controlled automatically through the solids bed level in the bottom stage of adsorber 20. Adsorber 20 is open to tower 10 via lines 21 and 29. Thus, pressure control on adsorber 10 automatically controls pressure on tower 20.

As shown in the drawing, the char for tower 20 is preferably withdrawn from the desorption steaming section of tower 10 at a lower point than the char intended for use in tower 10 itself. With this technique, the smaller char stream for tower 20 gets the full effect of the total desorption steam, that is, it is contacted with much more steam per pound of char. As a result the char in lines 46 and 49 is desorbed to a relatively very high degree and in turn results in a $C_2$ product of an especially high degree of purity in line 24.

The $C_3$ product may be withdrawn from the desorbing portion of tower 10, usually at the top of this portion, through aforementioned line 31. This is again preferably provided with a dust separator such as cyclone 30 which permits returning the separated solids to tower 10 through dip pipe 32. Further solids recovery as well as removal of desorption steam may be effected in scrubber 33 which may be of any conventional design. For instance, it may employ water scrubbing. The dust free $C_3$ gas product may finally be recovered through line 34, the withdrawal rate being determined by a valve 35 which is actuated by response to a product analyzer. Specifically, valve 35 may be keyed to the $C_2$ content of the $C_3$ product as determined by analyzer 36. That is, if the $C_2$ content of the $C_3$ product exceeds the specified limit, e. g. 1–5%, the $C_3$ withdrawal rate is throttled down, and the rate is increased if its $C_2$ content drops unnecessarily low. Here again it is desirable to provide a "limit control" on the char circulation rate to the sidestream adsorber, in a manner similar to that described previously in connection with the circulation rate to the main adsorber. Limit control on the char circulation to adsorber 20 assures against runaway conditions such as might tend to occur if it becomes necessary to withdraw less $C_3$ product than would be required to satisfy the material balance.

The stripping stream rate may be set constant at a ratio of about 2 to 20 lbs. of steam per 100 lbs. of normal total char circulating through the main adsorber; or the steam rate may be based on still other variables such as the $C_3$ content of the methane product fraction, increased stripping being necessary if the $C_3$ content of the methane fraction becomes unduly large.

Char heating and char cooling are controlled by conventional techniques. For instance, a heating fluid such as diphenyl may be circulated between a furnace (not shown) and heating coil 40, the furnace being fired at a rate controlled by the desired temperature of the adsorbent or by the vapor pressure of the diphenyl. If heating is done in more than one stage, diphenyl vapor rate to all but the bottom heating stage can be controlled by adsorbent temperatures, and furnace firing rate can be controlled either by the temperature of the hottest, bottom stage or by diphenyl vapor pressure or temperature. Similarly, the appropriate rate of coolant such as water circulating through cooling coils 9 will be determined by both the char temperature desired in the respective cooling stages and the exit temperature of the cooling water.

Apart from undergoing the principal adsorption-desorption cycle described above, the char is also preferably subjected to reactivation at high temperature. For this purpose, a portion of the char can be withdrawn from the top stage of adsorber 10 at about 300 to 400° F., passed downwardly through a multi-stage reactivator tower (not shown), and reactivated char can be withdrawn from the bottom stage of the reactivator at about 1000° F. and returned to the desorption zone of adsorber 10, e. g. in the vicinity of heater 40. It is preferred to circulate a portion of the char inventory between the adsorber and the reactivator continuously and at a constant rate, since such constant char feed rate to the reactivator has the advantage that an upset in one tower will not affect the other. However, variable char feed rates to the reactivator or even batchwise or intermittent reactivation, are also feasible.

The actual reactivation can be done in any suitable manner as is otherwise well known. For instance, in a preferred operation the char can be reactivated in the system and manner described and claimed in the copending Etherington patent application Serial No. 244,026, filed on August 28, 1951, the specification and drawing of which are hereby incorporated herein by reference. In view of this previous complete disclosure this reactivation technique will be summarized here only briefly.

The char is preferably fed into an upper stage of a fluid multi-stage reactivator at a continuous constant rate and reactivation steam is fed at a corresponding constant rate to the bottom of the reactivator and passed upwardly therethrough in countercurrent relation with the char. This reactivation steam rate may equal about 0.5 to 3 lbs. of steam per pound of char, depending mainly on pressure, temperature, and nature of deactivating impurities. The char exit rate from the reactivator is preferably regulated so as to maintain the fluid bed level in the bottom reactivator stage constant. Accordingly, the slide valve in the char exit line may be regulated by changes in the pressure drop across the bed level of the bottom stage.

The reactivation is usually carried out at char temperatures of about 1500 to 1600° F. To heat the char to this temperature a portion of the char is preferably withdrawn from an intermediate stage of the reactivation tower at about 1000° F. and heated by contacting it in a transfer or lift line with combustion gases previously heated to about 3000° F. in a separate burner. The char heating stage is controlled by regulating the fuel feed rate to the burner in response to the char temperature either in the lift line through which the heated char is being returned to the reactivation tower, or in response to the temperature of the char in the reactivator bed immediately above or immediately below the reheated char inlet, whichever temperature is more critical in any particular operation from the standpoint of char reactivation or char burning loss. The air rate to the burner is desirably proportional to the fuel rate and in an amount which gives negligible excess of oxygen relative to the equilibrium lift line temperature; or which does not produce an excessive char burning loss. Analysis of the reactivator exit gas for carbon content in terms of carbon monoxide and dioxide will give an indication of the carbon gasification and can be used as a guide for regulating the burner air rate. Operating experience in any given case will readily indicate the optimum combination of air/fuel ratio and maximum regenerator temperature for the best compromise between reactivation efficiency and char oxidation loss.

Char circulation between adsorber 10 and the reactivation tower can be conveniently effected by gravity flow without any lift gas assistance if the proper pressure differential is maintained between these two towers. Therefore, the reactivator exit gas rate is desirably controlled by the pressure differential between the top of the absorber and reactivator vessels. Char may be withdrawn from the reactivator bottom by overflow over a fixed weir at a rate dependent on the char feed rate to the top of the tower. As an alternate, the weir may be omitted and char withdrawn at a rate determined by the pressure drop across the fluidized bed of the withdrawal stage, that is, at a rate designed to maintain this bed level substantially constant. This latter method has the advantage of minimizing leakage of burner gas into the char withdrawal line and eventually into the adsorber.

The combustion gases required for heating the char to the desired extent usually give an adequate density differential between the contents of the lift line through which reheated char is returned from the external heating stage to the reactivator and the standpipe through which char is withdrawn from the reactivator to the heating stage. Thus, with the burner at grade level and the reactivator suspended at a level corresponding to an intermediate portion of the adsorber, the pressure build-up in the char withdrawal line is usually enough to permit the slide valve in the withdrawal line to operate partially closed as desired. Otherwise, the reactivator can be raised to a higher level, and, if required, spent char feed conveyed to it from the adsorber with the aid of recycle generator exit gas as lift gas pressured in an additional blower. Similarly, if the reactivator is at a low level relative to the adsorber, reactivated char from the bottom of the reactivator can be raised to the appropriate adsorber stage with the aid of a lift gas such as line 31 gas recycle, steam, or the like.

Of course, while the invention has been described in the foregoing example with special reference to the separation of a cracked $C_1$—$C_3$ hydrocarbon stream into three separate $C_1$, $C_2$ and $C_3$ fractions, the invention is similarly applicable to other separations. For instance, the invention can be used for effecting separation between hydrogen and hydrocarbons such as methane from the recycle gas of various hydrogenation processes or from the tail gas of an ethylene purification unit using cracked ethane feed or particularly from the tail gas of a naphtha hydroforming operation; for the separation of acetylene produced in dilute form by partial oxidation of methane or ethane; for the separation of nitrogen and/or individual hydrocarbon fractions such as methane from natural gas for the purpose of saving on pipe line compression costs, upgrading the value of the gas and for other reasons; and for the separation of various refinery residue gases and light ends from hydrocarbon synthesis gases. Still other uses, including those which may involve liquid feeds, will undoubtedly occur to those skilled in the art within the scope of the present teaching. Gaseous and liquid feeds will be hereafter referred to generically as fluid feeds. The term "fluid," in this case, of course, is used in its classical meaning as distinguished from its more recent use in expressions such as "fluid solids" or "fluid bed of solids." In the latter expressions "fluid" conveys the now well-known alternate meaning that a mass of finely divided solids is aerated or fluidized by an upflowing true fluid, usually a gas, so that the solid mass assumes many of the hydrostatic and hydrodynamic properties normally associated with a true fluid.

The control arrangements themselves may also be varied from those particularly described above. For instance, while separate continuous gas analyzers have been shown for the $C_1$, $C_2$ and $C_3$ product streams, it is entirely feasible to operate with a single analyzer unit and use it intermittently for sampling or analyzing the several streams in sequence. For purposes of the present invention all such alternatives are included generically in expressions such as "substantially continuous analysis" or expressions of similar import.

The gas analyzers may be installed on the net product lines rather than the recycle lines. For instance, particularly if net $C_1$ or tail gas product is withdrawn at an intermediate point of the adsorption section and differs in $C_3$ content from the overhead lift gas, it may be advantageous to install analyzer 13 on line 7 rather than on line 8 as shown in the drawing. Similarly, analyzer 48 may be on product line 24 rather than recycle line 25. This may be particularly appropriate if char to the sidestream adsorber is conveyed by a gas other than $C_2$ recycle.

Furthermore, while the invention is particularly valuable in connection with systems having relatively small inventories of adsorbent as is the case in fluid char adsorption, the invention can be similarly adapted to soaker-type processes such as hypersorption, provided that allowance is made for the fact that the response of such a process to controls is much slower because of the inherently large solids inventory. However, controls based on analyses of tower gas in the vicinity of temperature plateaus rather than on product streams would be as quick in response as temperature controls. In fact, if practical soaker-type bed designs involving interstage cooling in the adsorption zone and heating in the rectification zone are eventually developed, analytical controls would probably be mandatory.

In brief, the present invention is not limited to any particular feed compositions or specific design arrangements, but broadly provides a novel technique for analytical control of commercial adsorption systems and more specifically provides the only practical way so far developed for controlling a fluidized solid adsorption process. Unlike in conventional separation processes such as distillation, where control is based primarily on determination of pressure or temperature, the present invention is based principally on analysis of the various product streams and on use of the analytical data for integrated process control by means of a coordinated regulation of the flow rates of the various streams of solid adsorbent and gaseous or liquid products.

Having given a full description of the general nature of the invention and illustrated it by a specific embodiment, its patentable scope is particularly pointed out in the appended claims.

We claim:

1. A continuous adsorption process for separating a gaseous feed mixture into at least two of its components which comprises introducing said feed mixture at a substantially constant volumetric rate into an intermediate portion of a vertically elongated adsorption zone, passing said feed mixture upwardly through said zone, introducing finely divided solid adsorbent into an upper portion of said zone, passing said adsorbent downwardly through said zone in countercurrent flow with respect to said feed mixture, maintaining said adsorbent in said zone as a multiplicity of superimposed stages each of which contains a densely fluidized transverse bed having an upper level and a more dilute solid-in-gas suspension thereabove, withdrawing a fraction containing the separated relatively less adsorbable of said feed components from an upper portion of said zone at a rate controlled to maintain a substantially constant pressure at the top of said contacting zone, passing the adsorbent containing the relatively more adsorbable feed component from the bottom portion of said adsorption zone to a desorption zone, desorbing said relatively more adsorbable feed component from said adsorbent in said desorption zone, removing a fraction containing said desorbed component from an upper portion of said desorption zone, returning the resulting regenerated adsorbent to the upper portion of said adsorption zone, passing said withdrawn less adsorbable fraction to and continuously analyzing it in a gas analyzing zone, and controlling the purity of the withdrawn less adsorbable fraction by automatically adjusting the recirculation rate of the regenerated adsorbent to the top of the adsorption zone in response to and in direct relation to the analytically determined concentration of the more adsorbable components persent in said less adsorbable fraction.

2. A process according to claim 1 wherein said desorbed relatively more adsorbable fraction is passed to and analyzed in a gas analyzing zone and the net withdrawal rate of said more adsorbable fraction is adjusted in inverse relation to the concentration of the less adsorbable component in said more adsorbable fraction so as to maintain the purity of the withdrawn more adsorbable fraction at the desired value.

3. A process according to claim 1 wherein said feed mixture contains substantial quantities of $C_1$ to $C_3$ paraffins and olefins.

4. A process according to claim 1 wherein said gaseous feed mixture consists essentially of normally gaseous hydrocarbons, at least one non-hydrocarbon component selected from the group consisting of hydrogen, nitrogen and oxides of carbon and wherein at least one of said non-hydrocarbon components is recovered as a separate fraction.

5. In a continuous adsorption process for separating a $C_1$ to $C_3$ hydrocarbon mixture into a $C_1$ fraction, a $C_2$ fraction and a $C_3$ fraction which comprises introducing said hydrocarbon mixture at a substantially constant volumetric rate into an intermediate portion of a vertically elongated main contacting zone, passing said mixture upwardly through said main zone, introducing finely divided adsorbent char into an upper portion of said main zone, flowing said char downwardly through said main zone in countercurrent flow with respect to said hydrocarbon mixture, maintaining said flowing char in said main zone as a multiplicity of superimposed stages each of which contains a dense fluidized transverse bed having an upper level and a more dilute solid-in-gas suspension thereabove, withdrawing a net product portion of the separated $C_1$ fraction from an upper portion of said main zone, withdrawing a crude fraction containing mainly $C_2$ hydrocarbons from an intermediate portion of said main zone at a point below the feed inlet, desorbing the $C_3$ hydrocarbons from said char in a desorbing portion in the lower part of said main zone, withdrawing a net product portion of said desorbed $C_3$ hydrocarbon fraction from said main zone at a point above said desorbing portion and below said $C_2$ hydrocarbon draw-off, removing desorbed char from the bottom of said desorbing portion, and recirculating said desorbed char to the top of said main zone, the improvement which comprises passing the withdrawn $C_1$ fraction to and analyzing it substantially continuously in a gas analyzing zone, controlling the purity of the withdrawn $C_1$ fraction at the desired value by automatically adjusting the recirculation rate of the desorbed char to the top of the main zone in direct relation to the $C_2$ hydrocarbon content of said withdrawn $C_1$ fraction but not letting the char rate exceed 130% of normal operating rate, measuring the pressure at the top of the main zone, maintaining said pressure substantially constant by an automatic adjustment of the net withdrawal rate of the $C_1$ fraction in direct relation to said top pressure, passing said withdrawn $C_3$ fraction to and analyzing it substantially continuously in a gas analyzing zone, and maintaining the purity of the withdrawn $C_3$ fraction at the desired level by an automatic adjustment of the net withdrawal rate of said $C_3$ fraction in inverse relation to its $C_2$ content.

6. A process according to claim 5 wherein a portion of the withdrawn $C_1$ fraction is used as a lift gas for recirculating the desorbed char to the top of the main zone, said lift gas portion being substantially proportional to the amount of char being recirculated.

7. A process according to claim 5 wherein the withdrawn crude $C_2$ fraction is passed to a lower portion of a secondary adsorption zone, a portion of said desorped char other than the char portion being recirculated to the top of the main adsorption zone is extensively steam stripped and passed to the top and downwardly through said secondary adsorption zone in countercurrent flow with respect to said $C_2$ fraction while said char is maintained as a plurality of dense fluidized transverse beds separated by less dense phases, a purified $C_2$ fraction is withdrawn from an upper portion of said secondary adsorption zone, the char from the bottom of said secondary adsorption zone is returned to said main zone at a point between its $C_3$ and crude $C_2$ draw-offs, the purified $C_2$ fraction is passed to and analyzed substantially continuously in a gas analyzing zone, the circulation rate of said steam stripped char to the top of said secondary adsorption zone is automatically adjusted in direct relation to the $C_3$ content of the purified $C_2$ fraction withdrawn from said secondary adsorption zone, and the net withdrawal rate of said purified $C_2$ fraction is automatically adjusted in inverse relation to its $C_1$ content.

8. A process according to claim 7 wherein a portion of the purified $C_2$ fraction is used as a lift gas for recirculating said steam stripped char to the top of said secondary adsorption zone.

9. In combination with an apparatus for continuously separating a gaseous mixture into less adsorbable, intermediately adsorbable and more adsorbable fractions which comprises in descending order a vertically elongated main shell containing an upper adsorption zone, an intermediate rectification zone, a desorption zone and a bottom stripping zone, means for introducing gaseous feed into a lower portion of said adsorption zone at a substantially constant volumetric rate, a main conduit for circulating finely divided solid adsorbent from a lower portion of said shell to the upper portion of said shell, an outlet line for withdrawing gases from an upper portion of said adsorption zone, at least one secondary adsorption vessel, outlet means for passing at least one portion of intermediately adsorbable gases from an intermediate portion of said rectification zone to a lower portion of at least one said secondary vessel, a secondary conduit for passing desorbed and stripped adsorbent from the bottom portion of said main shell to an upper portion of said secondary vessel, means for returning adsorbent from the bottom portion of said secondary vessel to the rectification zone of the main shell below its said outlet means for said intermediately adsorbable gases, an outlet line for withdrawing a purified intermediately adsorbable gas fraction from the upper portion of said secondary vessel, means for desorbing the relatively more adsorbable gases in the desorption zone of said main shell, and a draw-off line for withdrawing a fraction of desorbed relatively more adsorbable gases from said main shell in the upper portion of said desorption zone, the improved automatic control means which comprises a pressure responsive valve in said outlet line for said relatively less adsorbable gases adapted automatically to adjust the withdrawal rate of said relatively less adsorbable gas fraction so as to maintain the pressure in said main shell substantially constant, an automatic means adapted to analyze the relatively less adsorbable gas fraction and to control the adsorbent circulation rate to the top of said main shell in direct relation to the intermediately adsorbable gas content of said relatively less adsorbable gas fraction so as to maintain said intermediately adsorbable gas content of said less adsorbable gas fraction substantially constant, an automatic gas analyzer adapted for analyzing the purified intermediately adsorbable gas fraction withdrawn from said secondary vessel, in said outlet line for said purified intermediately adsorbable gas a valve automatically actuated by an impulse from said gas analyzing means for said intermediately adsorbable gas fraction, said impulse being inversely related to the less adsorbable gas content of said purified intermediately adsorbable gas fraction and adapted to keep this less adsorbable gas content substantially constant, in said secondary adsorbent circulation conduit a means for automatically controlling adsorbent rate actuated by an impulse from said intermediately adsorbable gas analyzing means directly related to the relatively more adsorbable gas content of said purified intermediately adsorbable gas fraction and adapted to keep this relatively more adsorbable gas content substantially constant, an automatic gas analyzer for analyzing the intermediately adsorbable gas content of the withdrawn relatively more adsorbable gas fraction, and a valve automatically actuated by an impulse from said relatively more adsorbable gas analyzer inversely related to the intermediately adsorbable gas content of said relatively more adsorbable gas fraction and adapted to control the net withdrawal rate of the relatively more adsorbable gas fraction such as to maintain its intermediately adsorbable gas content substantially constant.

References Cited in the file of this patent

UNITED STATES PATENTS

| | | |
|---|---|---|
| 2,519,874 | Berg | Aug. 22, 1950 |
| 2,523,149 | Scheeline | Sept. 19, 1950 |
| 2,529,289 | Gilliland | Nov. 7, 1950 |
| 2,609,887 | Berg | Sept. 9, 1952 |
| 2,636,574 | Widdowson et al. | Apr. 28, 1953 |
| 2,666,500 | Cahn et al. | Jan. 19, 1954 |
| 2,678,111 | Ogorzaly | May 11, 1954 |
| 2,684,731 | Starr et al. | July 27, 1954 |
| 2,710,668 | Etherington | June 14, 1955 |